(12) United States Patent
Devoe (10) Patent No.: US 6,924,967 B1
(45) Date of Patent: Aug. 2, 2005

(54) NONINTERDIGITATED MOUNTING FOR INTERDIGITATED STACKED CAPACITOR AND METHOD

(76) Inventor: Alan Devoe, 5715 Waverly Ave., La Jolla, CA (US) 92037

(*) Notice: Subject to any disclaimer, the term of this patent is extended or adjusted under 35 U.S.C. 154(b) by 0 days.

(21) Appl. No.: 10/836,888

(22) Filed: Apr. 30, 2004

(51) Int. Cl.[7] .................................................. H01G 4/30
(52) U.S. Cl. ................................. 361/301.4; 361/308.1; 361/309; 361/321.2; 29/856
(58) Field of Search .......................... 361/321.3, 321.4, 361/321.5, 772, 773, 782, 809–811, 807, 308.1, 309, 301.4, 303, 307, 308.2, 310–312, 320, 306.1, 306.2, 306.3, 321.2

(56) References Cited

U.S. PATENT DOCUMENTS 4,715,118 A * 12/1987 Bernard et al. ............... 29/856
5,880,925 A    3/1999 DuPre et al.
6,243,253 B1   6/2001 DuPre et al.
6,362,948 B1 * 3/2002 Moriwaki et al. ........ 361/308.1

* cited by examiner

Primary Examiner—Anthony Dinkins
(74) Attorney, Agent, or Firm—Wood, Herron & Evans, L.L.P.

(57) ABSTRACT

An interposer connector for connecting an interdigitated capacitor to a substrate having a first track to be electrically connected to first capacitor terminals and an opposed second track to be electrically connected to second capacitor terminals. The interposer connector supports the interdigitated capacitor and has a first electrical conductor electrically connectable to the first track and the first capacitor terminals and a second electrical conductor electrically connectable to the second track substrate and the second capacitor terminals.

22 Claims, 10 Drawing Sheets

NONINTERDIGITATED MOUNTING FOR INTERDIGITATED STACKED CAPACITOR AND METHOD

FIELD OF THE INVENTION

The present invention relates generally to stacked ceramic capacitors and more specifically, to mounting an interdigitated stacked ceramic capacitor to a substrate.

BACKGROUND OF THE INVENTION

A switch mode power supply, which is also known as a switching power supply, a switching regulator, a DC to DC converter, etc., is commonly used in applications requiring high efficiency, minimal heat dissipation, multiple voltages and higher powers, for example, over 10 watts. A switching power supply controls output current by pulse width modulating a power switch and has an advantage of being very efficient and highly responsive to the current requirements of the load. The responsiveness of a switching power supply is constantly being improved by increasing the rate or frequency at which the power switch is operated. Newer designs operate the power switch in the megahertz range. A switching power supply uses an inductor-capacitor circuit that stores energy when the power switch is turned on, and the inductor-capacitor circuit supplies energy to the load when the power switch is turned off.

In order to have a fast response time, the capacitor in the inductorcapacitor circuit must have a very low inductance, which is an inherent characteristic of ceramic capacitors. However, as the operating frequency of the power switch increases and pulse rise times decrease, the inductance of the capacitor must be reduced even further. In the last several years, commercially available stacked ceramic capacitors have an inductance substantially less than 100 picoHenry ("pH"), for example, about 25 pH. The reduced inductance is achieved in several ways, for example, by optimizing the aspect ratio of the capacitor chip size, providing interdigitated multiple terminations, etc.

Figure 9:
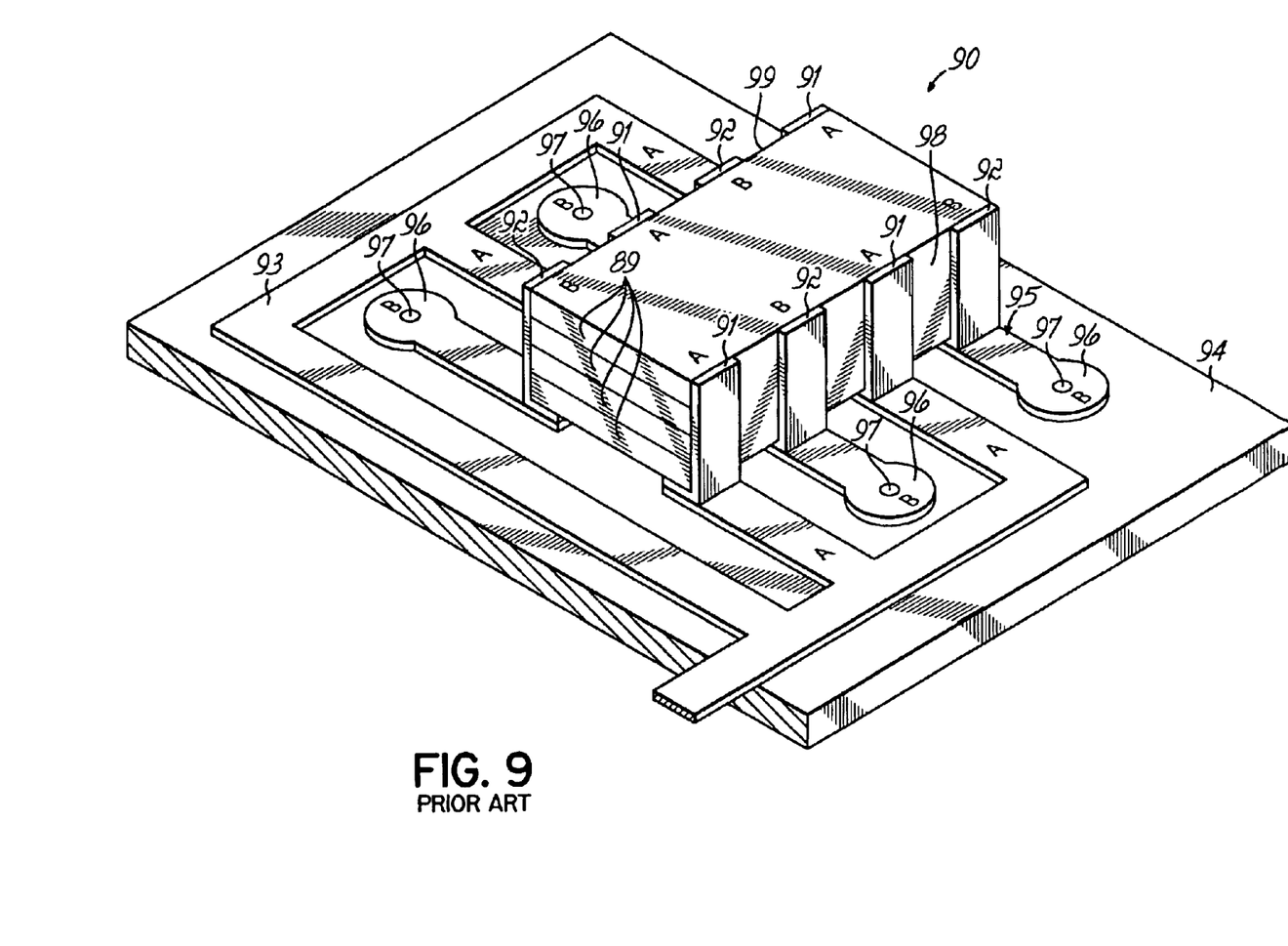
FIG. 9 is an enlarged perspective view of a known example of connecting an interdigitated capacitor to a substrate.

Although performance is improved, the interdigitated arrangement of capacitor terminations has several disadvantages. First, as shown in FIG. 9, an interdigitated stacked ceramic capacitor 90 comprised of stacks of capacitors 89 has first A terminal strips 91 that are to be connected between capacitor terminals in one capacitor stack and a first, electrically conductive A track or trace 93 on the substrate 94. The interdigitated capacitor 90 has second B terminal strips 92 that are to be connected between capacitor terminals in an adjacent capacitor stack and a second electrically conductive B track or trace 95 on the substrate 94. The arrangement of alternating terminal strips 91, 92 can be on either one side 98 of the interdigitated capacitor 90 or on both sides 98, 99. The alternating arrangement of the A and B terminal strips 91, 92 means that adjacent stacks of capacitors connected to the terminals 91, 92 will have opposite current flows. As can be seen in FIG. 9, one set of the terminal strips 91,92, for example, the A terminal strips 91, can be easily connected to a track 93 of a PC board 94. However, running the conductive track 93 to all of the A terminal strips 91 leaves little space for running a conductive track to all of the B terminal strips 92. The B terminal strips 92 are connected to tracks 96, and often vias 97 are used to connect the B terminal strips 92 to a common track (not shown) on an opposite side of the PC board 94. As the number of interdigitated capacitors increases, the complexity of the PC board layout goes up dramatically and presents a significant PC board design challenge. Therefore, the use of interdigitated capacitors requires that the PC board be designed from scratch specifically for such capacitors.

A second disadvantage is that an interdigitated capacitor cannot be used as plug-in replacement for a noninterdigitated capacitor. A noninterdigitated capacitor has all current flows in the same direction. Therefore, all of the terminal strips on one side of the capacitor are connectable to a PC board track beneath one side of the capacitor, and all terminal strips on an opposite side of the noninterdigitated capacitor are connected to a PC board track beneath an opposite side of the noninterdigitated capacitor. Thus, the PC board layout is substantially simpler than that required for interdigitated capacitors and is incompatible with the requirement of opposite current flows in adjacent capacitors in interdigitated capacitors. Since, interdigitated capacitors cannot be used as a "drop-in" or direct replacement for noninterdigitated capacitors, interdigitated capacitors cannot be used to improve the performance of PC boards designed for noninterdigitated capacitors.

Therefore, there is a need to provide a capability of using interdigitated capacitors, which does not have the disadvantages discussed above.

SUMMARY OF THE INVENTION

The present invention provides an apparatus and method that simplify PC board layout when using interdigitated capacitors as well as permit interdigitated capacitors to be drop-in replacements for noninterdigitated capacitors on existing PC boards.

According to the principles of the present invention and in accordance with one embodiment, the present invention provides an apparatus for connecting an interdigitated capacitor to a substrate. The interdigitated capacitor has first rows of first capacitor terminals and second rows of second capacitor terminals, wherein the first rows are alternately arranged with the second rows on one end of the interdigitated capacitor. The substrate has an electrically conductive first track to be electrically connected to the first capacitor terminals and an electrically conductive second track to be electrically connected to the second capacitor terminals. An interposer connector supports the interdigitated capacitor and has a first electrical conductor electrically connectable to the first track and the first capacitor terminals, and a second electrical conductor electrically connectable to the second track substrate and the second capacitor terminals.

In different embodiments of the invention, the interposer connector can be made from an electrically conductive or electrically nonconductive material. Alternatively, the interposer connector can be made of first and second lead frames carrying the respective first and second electrical conductors can consist of a single lead frame carrying the first and second electrical conductors. In further embodiments, the interposer connector can be used with interdigitated capacitors having contacts on only one end or contacts on both ends. In another embodiment, the interposer connector can be a substrate with the first and second electrical conductors.

These and other objects and advantages of the present invention will become more readily apparent during the following detailed description taken in conjunction with the drawings herein.

DETAILED DESCRIPTION OF THE INVENTION

Figure 1:
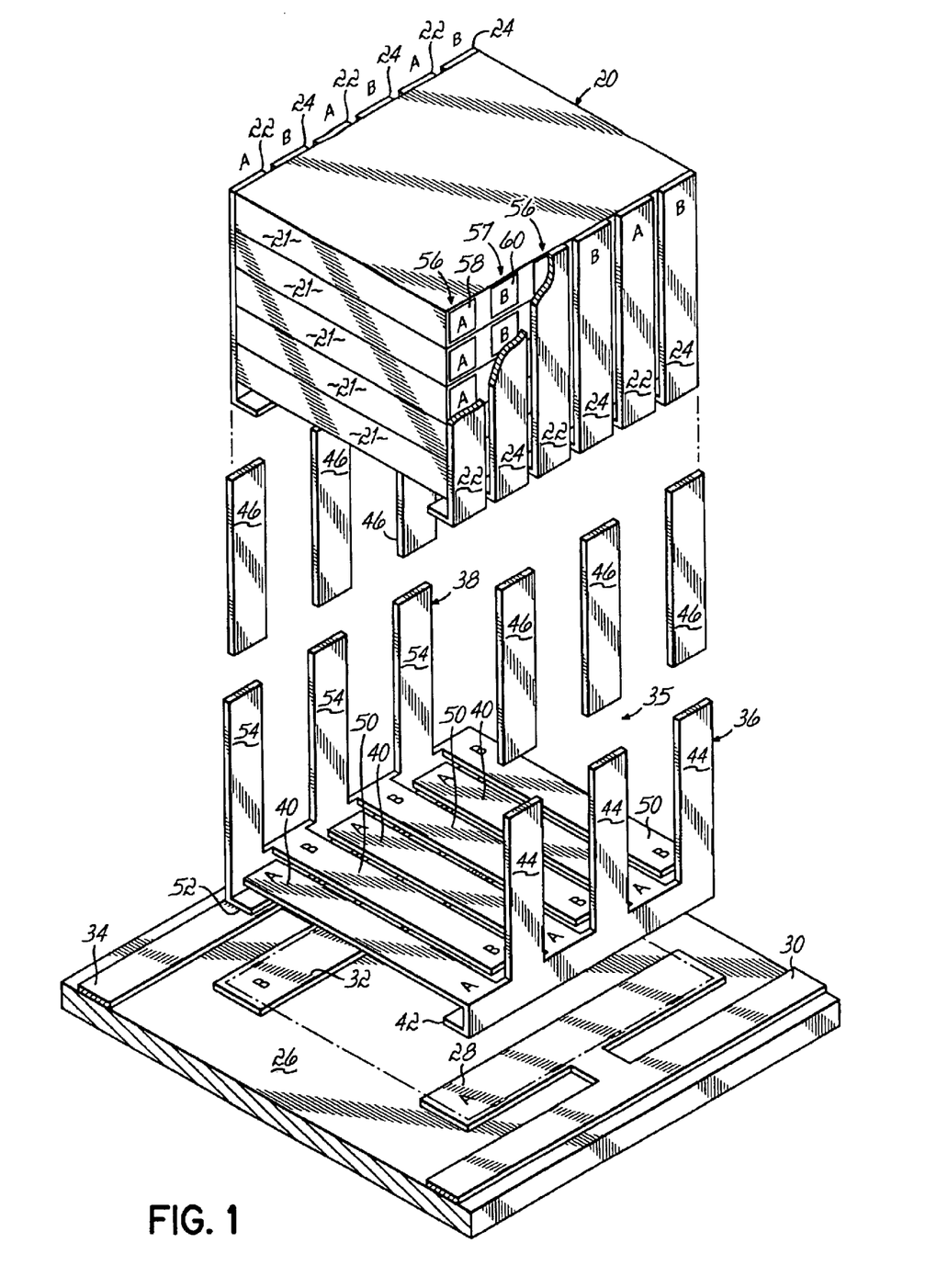
FIG. 1 is a disassembled enlarged perspective view of an interdigitated capacitor and a first embodiment of a lead frame in accordance with the principles of the present invention.

Referring to FIG. 1, an interdigitated stacked ceramic capacitor 20 is made from a stack of any number of capacitors 21. As described earlier, one technique of reducing inductance in the interdigitated stacked capacitor 20 is to provide a current flow in one direction in first capacitor rows 56 and a current flow in an opposite direction in adjacent, second capacitor rows 57. To achieve opposing current flows, terminals of capacitors in adjacent rows 56, 57 are connected to opposite sides of a circuit. Thus, as shown in FIG. 1, to achieve a current flow in one direction, capacitor A terminals 58 in the first capacitor row 56 are to be connected to one side of the circuit, that is, an electrically conductive A trace or track 30 on a substrate 26, for example, a PC board. To achieve a current flow in an opposite direction, capacitor B terminals 60 in the adjacent, second capacitor row 57 are to be connected to another side of the circuit, that is, an electrically conductive B trace or track 34 on the substrate 26. Therefore, the stacked capacitors 21 present a plurality of stacks of alternately spaced A terminals 58 and B terminals 60. In a known manner, the A terminals 58 in one stack of capacitors are connected to an A terminal strip 22; and the B terminals in an adjacent stack of capacitors are connected to a B terminal strip 24. The respective A and B terminal strips 22, 24 are arranged alternately along both sides of the interdigitated capacitor 20. To obtain the desired alternating current flows, all of the A terminal strips 22 must be connected to the trace 30; and all of the B terminal strips 24 must be connected to the trace 34. As described earlier, without the invention, a complex layout of pads and traces would be required in order to achieve the desired connections. However, the present invention permits the interdigitated capacitor 20 having the plurality of alternately arranged respective A and B terminal strips 22, 24 to be mounted to only two pads 28, 32, respectively, that are contiguous with, and a part of, respective tracks 30, 34. Further, the same two pads 28, 32 often provide a suitable mounting for a noninterdigitated capacitor in which all of the A terminal strips are on one side of the capacitor, and all of the B terminal strips are on an opposite side of the capacitor.

Figure 1A:
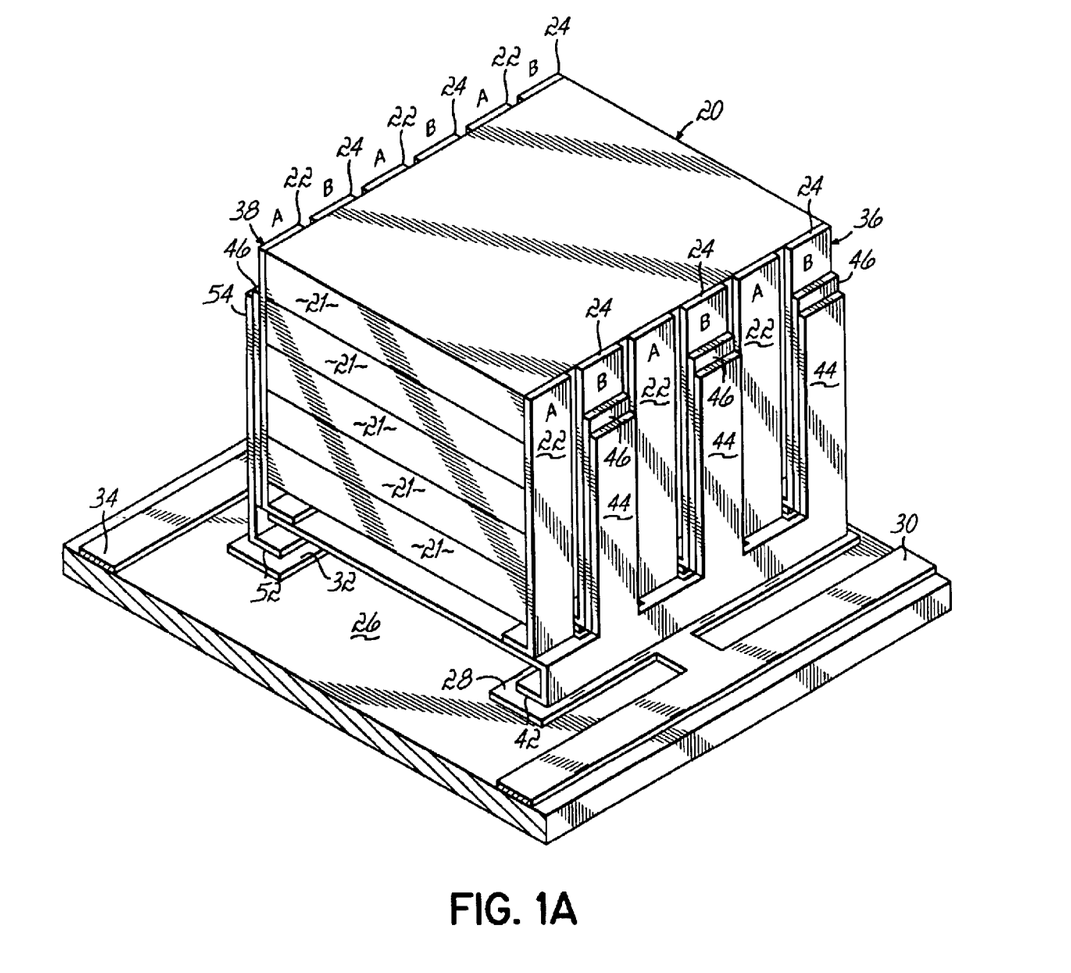
FIG. 1A is an assembled enlarged perspective view of an interdigitated capacitor and the lead frame of FIG. 1.

An interposer connector 35 is used to mount the interdigitated capacitor 20 on a substrate 26 having only pads 28, 32 that may have been originally designed to connect with a noninterdigitated capacitor. The interposer connector 35 is comprised of a pair of opposed lead frames 36, 38. An A lead frame 36 has A capacitor contacts 40 that are electrically connectable to the interdigitated capacitor terminals 22, and the A lead frame 36 further has an A substrate contact 42 that is electrically connectable to the pad 28 of track 30 on the substrate 26. Support arms or tabs 44 on A lead frame 36 extend along one side of the interdigitated capacitor 20 to provide mechanical support. In this embodiment, a B lead frame 38 is identical in construction to the A lead frame 36 and has B capacitor contacts 50 that are electrically connectable to the interdigitated capacitor terminals 24. The B lead frame 38 further has a B substrate contact 52 that is electrically connectable to the pad 32 of track 34. Support arms or tabs 54 on the B lead frame 38 extend along an opposite side of the interdigitated capacitor 20 to provide mechanical support. When fully assembled as shown in FIG. 1A, all of the A terminal strips 22 are connected to the track 30 via pad 28. Further, all of the alternately spaced B terminal strips 24 are connected to the track 34 via the pad 32 without the need for additional traces or pads on the substrate 26.

In the embodiment of FIG. 1, the lead frames 36, 38 are made from an electrically conductive material, for example, a metallic material. With the metal lead frames 36, 38, electrical insulators 46 are interposed between the tabs 44, 54 and capacitor terminals 24, 22, respectively.

Figure 2:
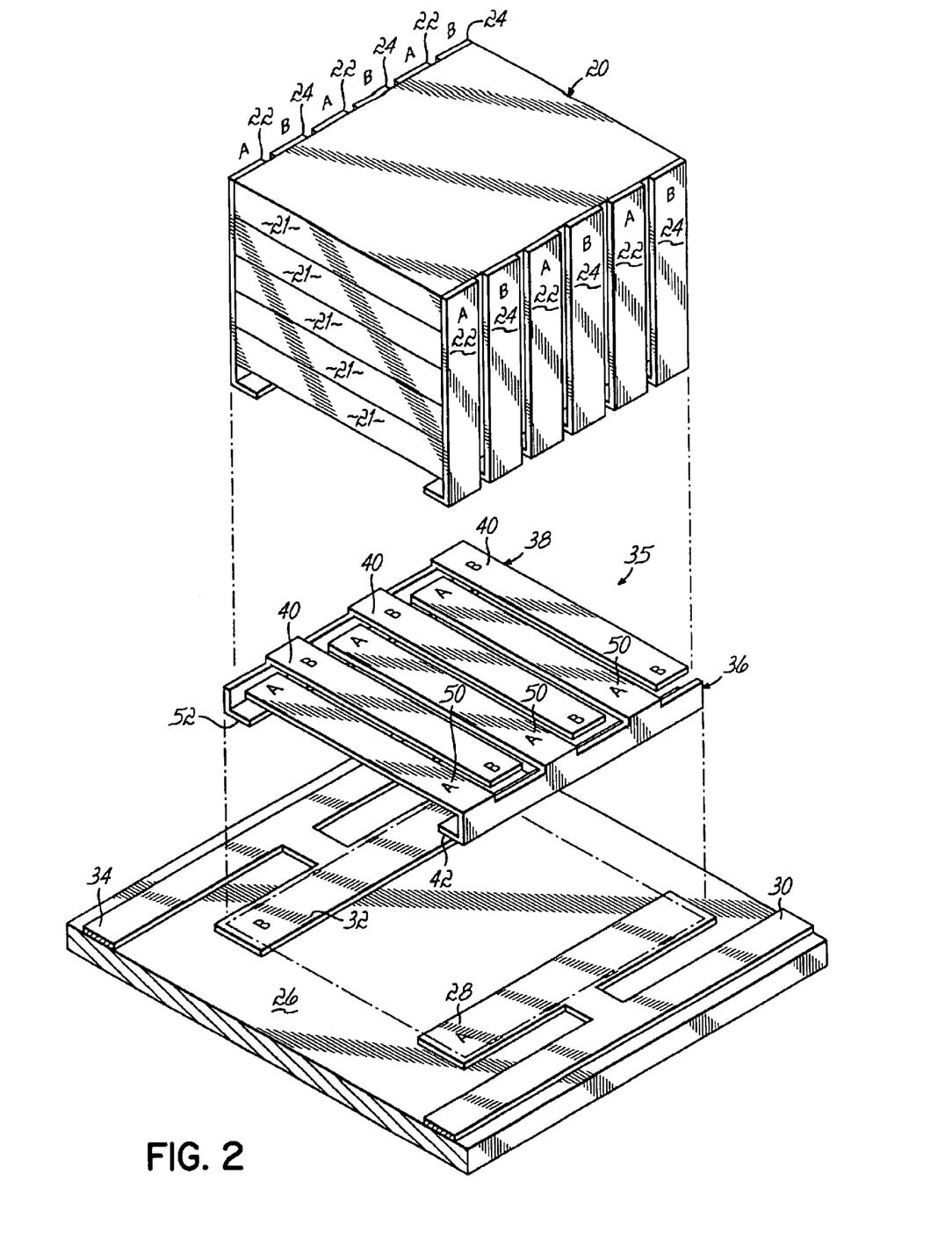
FIG. 2 is a disassembled enlarged perspective view of an interdigitated capacitor and a second embodiment of a lead frame in accordance with the principles of the present invention.

In an alternative construction of the lead frames 36, 38 of the interposer connector 35 shown in FIG. 2, the mechanical support arms 44, 54 of FIG. 1 are not used. The mechanical support arms 44, 54 are optional, and their use is determined on an application by application basis depending on several factors, for example, the size of the interdigitated capacitor 20, the strength of the bonding to the pads 28, 32, etc.

Figure 3:
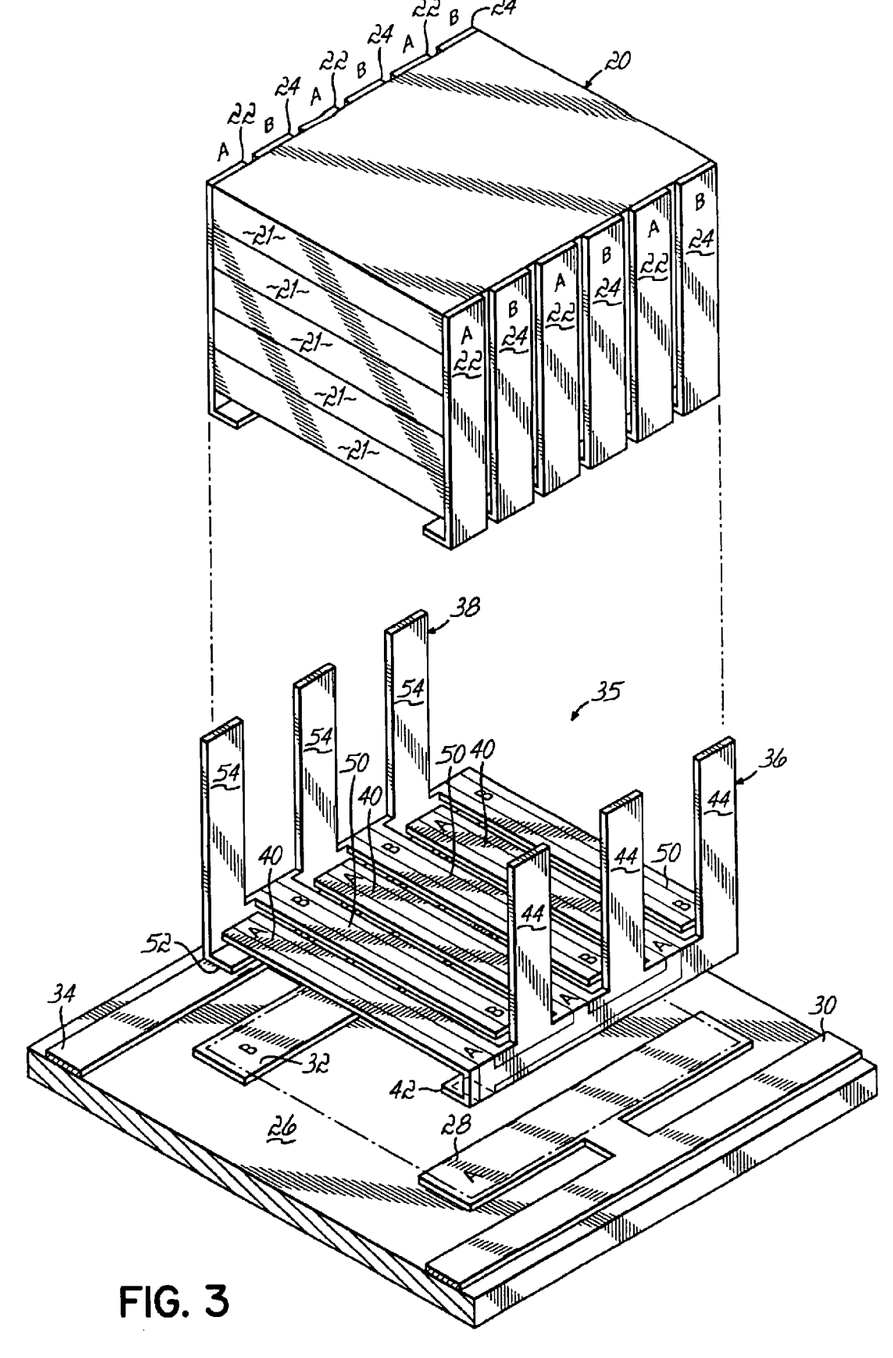
FIG. 3 is a disassembled enlarged perspective view of an interdigitated capacitor and a third embodiment of a lead frame in accordance with the principles of the present invention.
Figure 4:
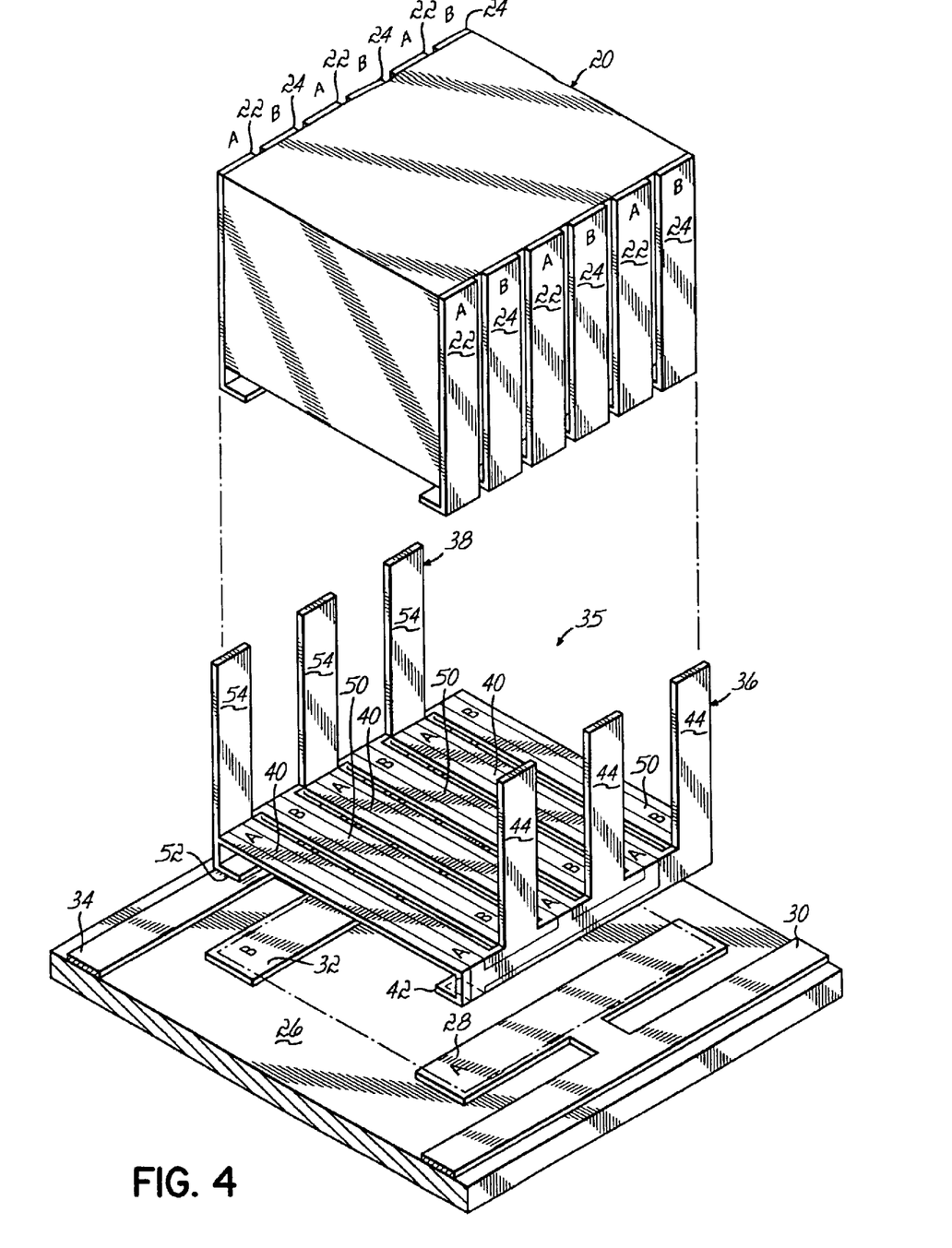
FIG. 4 is a disassembled enlarged perspective view of an interdigitated capacitor and a fourth embodiment of a lead frame in accordance with the principles of the present invention.

Alternatively, as shown in FIG. 3, the lead frames 36, 38 of the interposer connector 35 may be made from an electrically nonconducting material, for example, plastic or fiberglass to which electrical conducting paths or traces have been added to provide the A and B capacitor contacts 40, 50 and the A and B substrate contacts 42, 52. In a further embodiment, as shown in FIG. 4, the two lead frames 36, 38 can be molded or made as a single integral interposer connector 35; and electrical conducting traces routed thereon to provide the A and B capacitor contacts 40, 50 and the A and B substrate contacts 42, 52.

Figure 5:
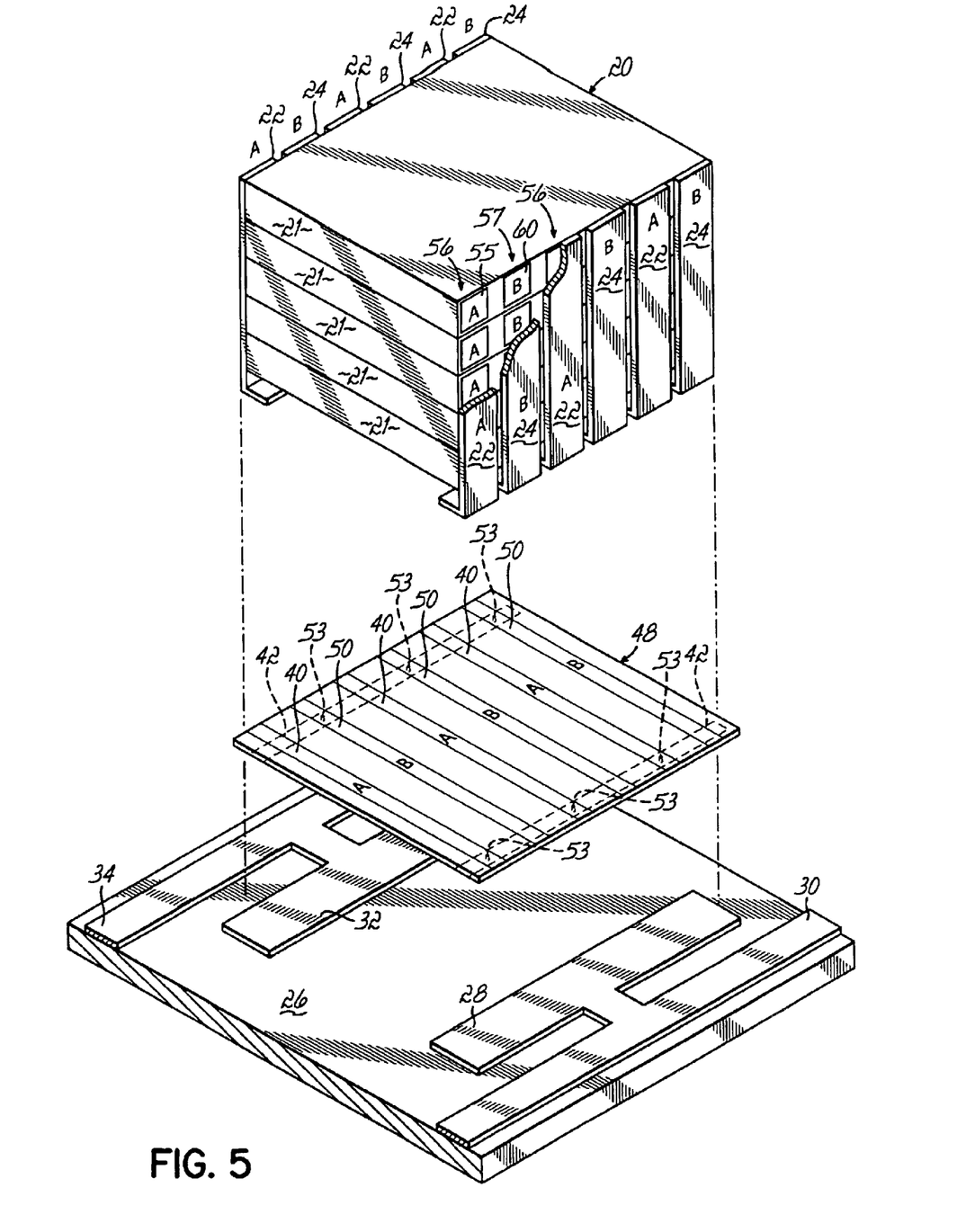
FIG. 5 is a disassembled enlarged perspective view of an interdigitated capacitor and a fifth embodiment of a lead frame in accordance with the principles of the present invention.

In a still further embodiment, as shown in FIG. 5, the interposer connector 35 can be implemented with a substrate 48 having an upper side on which the respective A and B capacitor contacts 40, 50 are located. The A and B substrate contacts 42, 52 are provided on an opposite, lower side of the substrate 48 and are connected to respective A and B capacitor contacts 40, 50 via respective first and second leads 53, for example, feedthrough connections, wires, etc., in a known manner.

Figure 6:
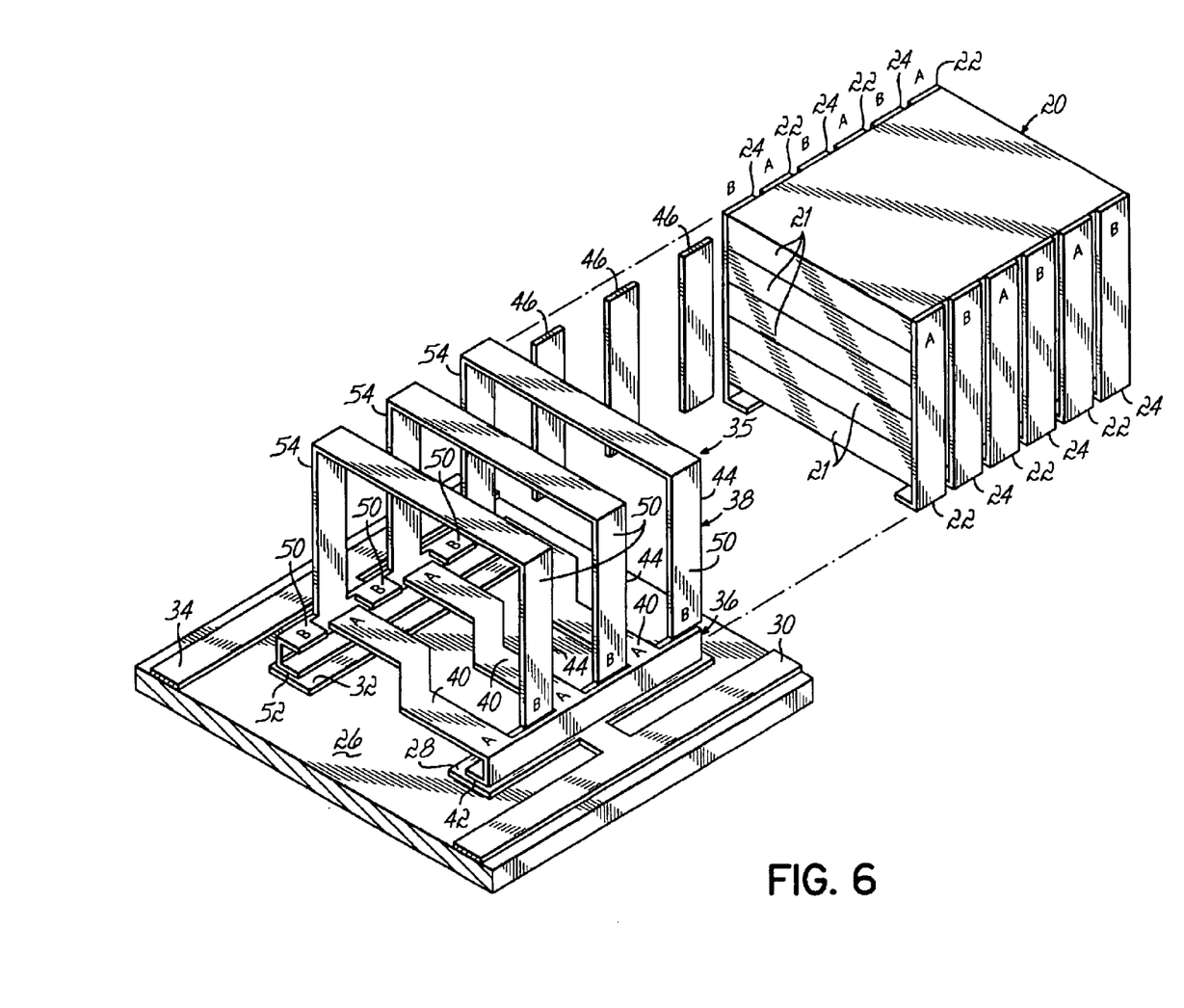
FIG. 6 is a disassembled enlarged perspective view of an interdigitated capacitor and a sixth embodiment of a lead frame in accordance with the principles of the present invention.

In the embodiments of FIGS. 1–5, an A terminal strip 22 on one side of the interdigitated capacitor 20 and connecting to the A lead frame is directly opposite an A terminal strip 22 on an opposite side of the interdigitated capacitor 20 also connecting to the A lead frame 36. Referring to FIG. 6, in an alternative embodiment of the interdigitated capacitor 20, an A terminal strip 22 on one side of the interdigitated capacitor 20 and connecting to A lead frame 36 is directly opposite a B terminal strip 24 on an opposite side of the interdigitated capacitor 20, which connects to B lead frame 38. Again, the A and B terminal strips 22, 24 are arranged in an alternating relationship on both sides of the interdigitated capacitor 20. With this configuration of capacitor leads and terminal strips 22, 24, a differently configured interposer connector 35 is required, which also uses insulators 46 between B capacitor contact legs 50a and adjacent A terminal strips 22 on one side of the interdigitated capacitor 20.

Figure 7:
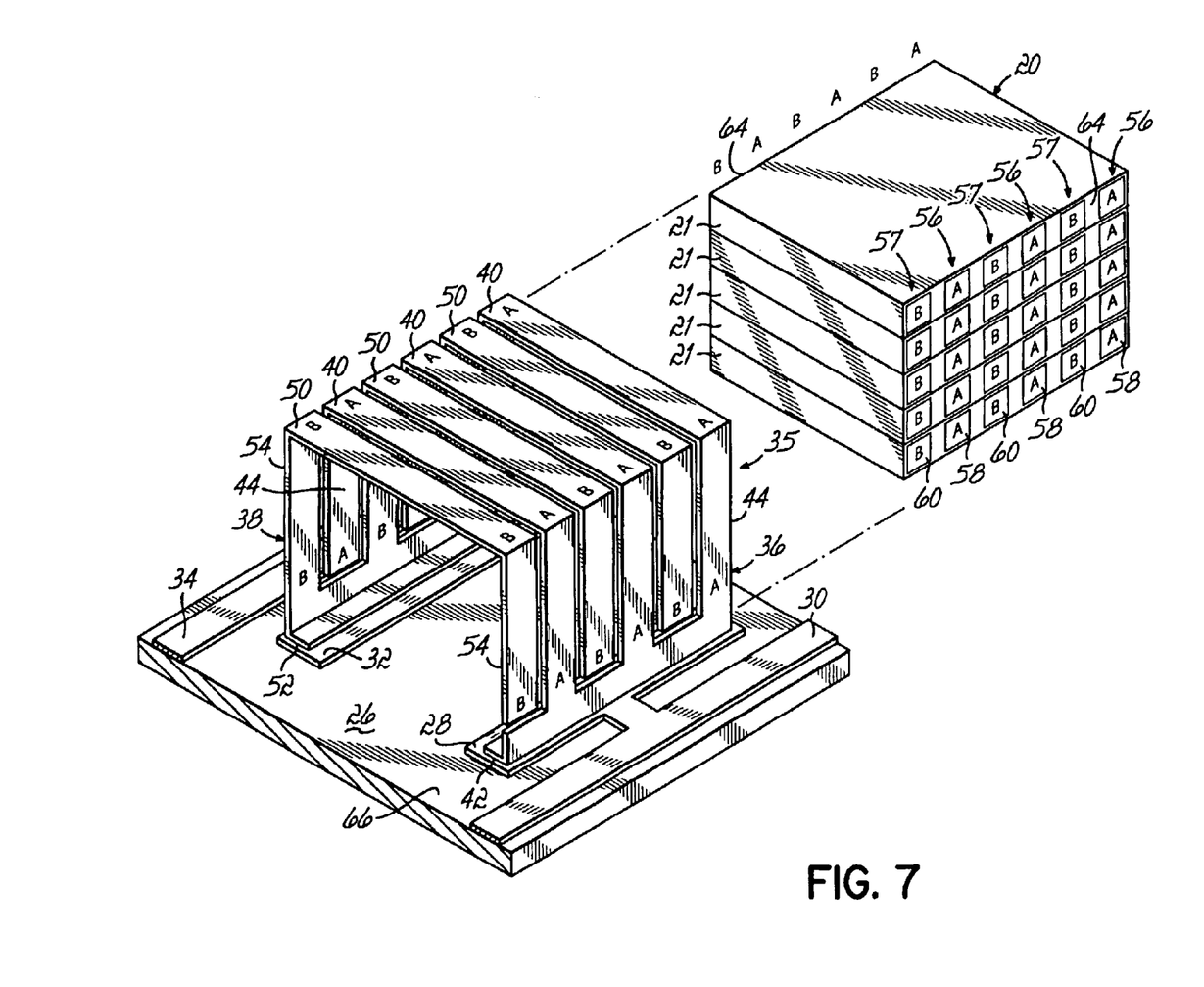
FIG. 7 is a disassembled enlarged perspective view of an interdigitated capacitor and a seventh embodiment of a lead frame in accordance with the principles of the present invention.

FIG. 7 illustrates another embodiment of the interposer connector 35 with an interdigitated capacitor having common opposed contacts on opposite sides of the interdigitated capacitor 20. In this embodiment, the A and B terminal strips 22, 24 shown in FIGS. 1–6 are not used; however, as before, the interdigitated capacitor 20 has a plurality of stacked capacitors 21 presenting capacitor rows 57 of B capacitor contacts 60 alternately spaced with capacitor rows 56 of A capacitor contacts 58. The A and B lead frames 36, 38 are slid over the interdigitated capacitor 20, and the A and B capacitor contacts 40, 50 are connected to the respective A and B capacitor terminals 58, 60 by solder, an electrically conductive bonding agent or other known means.

Figure 8:
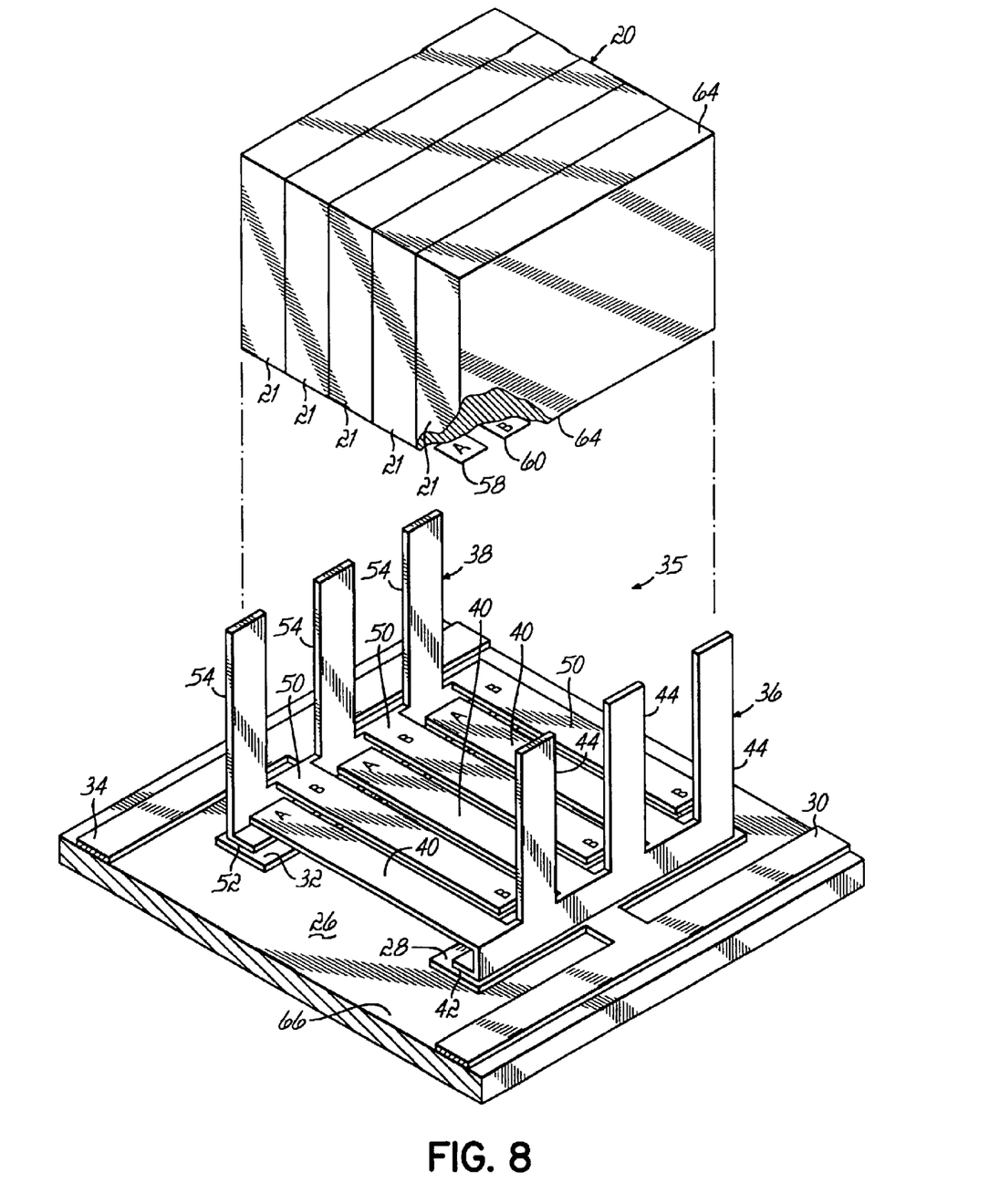
FIG. 8 is a disassembled enlarged perspective view of an interdigitated capacitor and an eighth embodiment of a lead frame in accordance with the principles of the present invention.

In the embodiments of FIGS. 1–7, the interdigitated capacitor 20 has a stack of capacitors 21 with ends 64 (FIG. 7) represented by the respective A and B terminals 58, 60 that are substantially perpendicular to a major planar surface or upper surface 66 of the substrate 26 on which the interdigitated capacitor 20 or interposer connector 35 is mounted. Such interdigitated capacitors are identified as being mounted horizontally. In an alternative embodiment illustrated in FIG. 8, the interdigitated capacitor 20 has a stack of capacitors 21 with ends 64 that are substantially parallel to the major planar surface or upper surface 66 of the substrate 26. Such interdigitated capacitors are identified as being vertically mounted; and further, such capacitors have interdigitated leads 58, 60 on only one end, for example, the end facing the substrate 26. The A and B capacitor contacts 40, 50 of the respective A and B frames 36, 38 are connected to the respective A and B capacitor terminals 58, 60 by solder, an electrically conductive bonding agent or other known means.

In use, the interposer connector 35 can be designed to have different sizes and shapes to accommodate the different geometries and capacitor terminal layouts of different interdigitated capacitors. Further, the interposer connector 35 is connected between the interdigitated capacitor 20 and tracks on the substrate 26 using known automated and manual methods of soldering, applying an electrically conductive bonding agent or other means. The interdigitated capacitor 20 can be manufactured and sold as an integral unit with an interposer connector 35, thereby substantially simplifying its use. The use of the interposer connector 35 substantially simplifies the layout of tracks on a substrate that are to be electrically connected to terminals of in interdigitated capacitor. Further, the interposer connector 35 permits interdigitated capacitors to be easily connected to tracks on a substrate that are designed to accept a noninterdigitated capacitor. Permitting an interdigitated capacitor to be a drop-in replacement for a noninterdigitated capacitor allows the performance of existing circuits to be substantially improved without having to rework the tracks on substrate, thereby improving performance at minimal cost.

While the present invention has been illustrated by a description of an embodiment, and while such embodiment has been described in considerable detail, there is no intention to restrict, or in any way limit, the scope of the appended claims to such detail. Additional advantages and modifications will readily appear to those skilled in the art. Therefore, the invention in its broadest aspects is not limited to the specific details shown and described. Consequently, departures may be made from the details described herein without departing from the spirit and scope of the claims which follow.

What is claimed is:

1. An apparatus for connecting an interdigitated capacitor to a substrate, the interdigitated capacitor having first rows of first capacitor terminals and second rows of second capacitor terminals, the first rows being alternately arranged with the second rows on one end of the interdigitated capacitor, and the substrate having an electrically conductive first track to be electrically connected to the first capacitor terminals and an electrically conductive second track to be electrically connected to the second capacitor terminals, the apparatus comprising:

an interposer connector adapted to support the interdigitated capacitor, the interposer connector comprising
      a first electrical conductor adapted to be electrically connectable to the first track on the substrate and the first capacitor terminals, and
      a second electrical conductor adapted to be electrically connectable to the second track on the substrate and the second capacitor terminals.

2. The apparatus of claim 1 wherein the interposer connector comprises an electrically nonconductive substrate supporting the first electrical conductor and the second electrical conductor.

3. The apparatus of claim 2 wherein the electrically nonconductive substrate comprises:

a first surface supporting the first electrical conductor and the second electrical conductor;
   first substrate contacts;
   second substrate contacts;
   a second surface supporting the first substrate contacts and the second substrate contacts; and
   first leads electrically connecting the first substrate contacts with the first electrical conductor; and
   second leads electrically connecting the second substrate contacts with the second electrical conductor.

4. The apparatus of claim 3 wherein the electrically nonconductive substrate comprises a PC board.

5. The apparatus of claim 4 wherein the first leads comprise first feedthrough connections and the second leads comprise second feedthrough connections.

6. The apparatus of claim 1 wherein the capacitor has an opposite end and the interposer connector further comprises:

first support arms extending adjacent the one end of the interdigitated capacitor; and
   second support arms extending adjacent the opposite end of the interdigitated capacitor, the first and second support arms mechanically supporting the interdigitated capacitor within the interposer connector.

7. The apparatus of claim 1 wherein the interposer connector comprises:

a first lead frame supporting the first conductor; and
a second lead frame separate and independent of the first lead frame and supporting the second conductor.

8. The apparatus of claim 7 wherein the first lead frame and the second lead frame are made from an electrically conductive material.

9. The apparatus of claim 7 wherein the first lead frame and the second lead frame are made from an electrically nonconductive material.

10. The apparatus of claim 7 wherein the capacitor has an opposite end and the interposer connector further comprises:
first support arms on the first lead frame and extending adjacent the one end of the interdigitated capacitor; and
second support arms on the second lead frame and extending adjacent the opposite end of the interdigitated capacitor, the first and second support arms mechanically supporting the interdigitated capacitor within the interposer connector.

11. The apparatus of claim 10 wherein the interposer connector further comprises first insulators disposed between first support arms extending adjacent second capacitor terminals on the first end.

12. The apparatus of claim 10 wherein the interposer connector further comprises second insulators disposed between first support arms extending adjacent first capacitor terminals on the opposite end.

13. The apparatus of claim 1 wherein the interdigitated capacitor has third rows of third capacitor terminals and fourth rows of fourth capacitor terminals, the third rows being alternately arranged with the fourth rows on another end of the interdigitated capacitor and wherein the first electrical conductor and the second electrical conductor are electrically connectable to the third capacitor terminals and the fourth capacitor terminals, respectively.

14. The apparatus of claim 13 wherein the interposer connector comprises:
a first lead frame supporting the first conductor; and
a second lead frame separate and independent of the first lead frame and supporting the second conductor.

15. The apparatus of claim 14 wherein the first lead frame and the second lead frame are made from an electrically conductive material.

16. The apparatus of claim 14 wherein the first lead frame and the second lead frame are made from an electrically nonconductive material.

17. An apparatus for connecting an interdigitated capacitor to a substrate, the interdigitated capacitor having first terminal strips electrically connecting first rows of first capacitor terminals and second terminal strips electrically connecting second rows of second capacitor terminals, the first terminal strips being disposed between the second terminal strips on one end of the interdigitated capacitor, the substrate having an electrically conductive first track to be electrically connected to the first terminal strips and an electrically conductive second track to be electrically connected to the second terminal strips, the apparatus comprising:
an interposer connector adapted to support the interdigitated capacitor, the interposer connector comprising
a first electrical conductor adapted to be electrically connectable to the first track on the substrate and the first terminal strips; and
a second electrical conductor adapted to be electrically connectable to the second track on the substrate and the second terminal strips.

18. An apparatus for connecting an interdigitated capacitor to a substrate, the interdigitated capacitor having first terminal strips electrically connecting rows of first capacitor terminals and second terminal strips electrically connecting second rows of second capacitor terminals, the first terminal strips being alternately arranged with the second terminal strips on opposed first and second ends of the interdigitated capacitor, the substrate having an electrically conductive first track to be electrically connected to the first terminal strips on the opposed ends of the interdigitated capacitor and an electrically conductive second track to be electrically connected to the second terminal strips on the opposed ends of the interdigitated capacitor, the apparatus comprising:
an interposer connector adapted to support the interdigitated capacitor, the interposer connector comprising
a first electrical conductor adapted to be electrically connectable to the first track on the substrate and the first terminal strips; and
a second electrical conductor adapted to be electrically connectable to the second track on the substrate and the second terminal strips.

19. An apparatus for connecting an interdigitated capacitor to a substrate, the interdigitated capacitor having first terminal strips electrically connected to first rows of first capacitor terminals and second terminal strips electrically connected to second rows of second capacitor terminals, the first terminal strips being disposed between the second terminal strips on each of two opposed ends of the interdigitated capacitor, the substrate having an electrically conductive first pad to be electrically connected to the first terminal strips and an electrically conductive second pad to be electrically connected to the second terminal strips, the first and second pads being disposed on the substrate to receive, and electrically connect to, terminals of a noninterdigitated capacitor, the apparatus comprising:
an interposer connector adapted to support the interdigitated capacitor, the interposer connector comprising
a first electrical conductor adapted to be electrically connectable to the first track on the substrate and the first terminal strips; and
a second electrical conductor adapted to be electrically connectable to the second track on the substrate and the second terminal strips.

20. An apparatus for connecting an interdigitated capacitor to a substrate, the interdigitated capacitor having first terminal strips electrically connected to first rows of first capacitor terminals and second terminal strips electrically connected to second rows of second capacitor terminals, the first terminal strips being disposed between the second terminal strips on one end of the interdigitated capacitor, the substrate having only one electrically conductive pad of a first track to be electrically connected to the first terminal strips and only one electrically conductive pad of a second track to be electrically connected to the second terminal strips, the apparatus comprising:
an interposer connector adapted to support the interdigitated capacitor, the interposer connector comprising
a first electrical conductor adapted to be electrically connectable to the first track on the substrate and the first terminal strips; and
a second electrical conductor adapted to be electrically connectable to the second track on the substrate and the second terminal strips.

21. A PC board assembly comprising:
a PC board having a first pad on one side of an area for receiving first capacitor terminal and a second pad on an opposite side of the area for receiving second capacitor terminal;

an interdigitated capacitor having first capacitor terminals arranged between second capacitor terminals on an end of the interdigitated capacitor; and an interposer connector frame comprising
- a first conductor electrically connected to the first capacitor terminals and electrically connected to the first pad on the PC board, and
- a second conductor electrically connected to the second capacitor terminals and electrically connected to the second pad on the PC board.

22. A method of connecting an interdigitated capacitor to a substrate having a first pad on one side of a area for receiving a noninterdigitated capacitor and a second pad on an opposite side of the area for receiving the noninterdigitated capacitor, the method providing the interdigitated capacitor having first rows of first capacitor terminals and second rows of second capacitor terminals, the first rows being alternately arranged with the second rows on one end of the interdigitated capacitor; and connecting with an interposer connector the first capacitor terminals with the first path on the PC board and the second capacitor terminals with the second pad on the PC board.

* * * * *

UNITED STATES PATENT AND TRADEMARK OFFICE
CERTIFICATE OF CORRECTION

PATENT NO. : 6,924,967 B2
DATED : August 2, 2005
INVENTOR(S) : Alan Devoe

Page 1 of 1

It is certified that error appears in the above-identified patent and that said Letters Patent is hereby corrected as shown below:

Column 1,
Line 30, "inductorcapacitor" should read -- inductor-capacitor --.

Column 2,
Lines 51-52, "electrical conductors can consist" should read -- electrical conductors or can consist --.

Column 4,
Lines 31-32, "FIG. 1A" should read -- FIG. 1B --.

Column 5,
Line 64, "of in interdigitated" should read -- of an interdigitated --.

Column 9,
Line 12, "of a area" should read -- of an area --.

Column 10,
Line 2, "the method" should read -- the method comprising: --.
Line 9, "the first path" should read -- the first pad --.

Signed and Sealed this

Twenty-seventh Day of December, 2005

JON W. DUDAS
*Director of the United States Patent and Trademark Office*